United States Patent
Chen

(10) Patent No.: US 6,767,069 B2
(45) Date of Patent: Jul. 27, 2004

(54) BICYCLE WHEEL RIM HAVING CORNER REINFORCING MEMBERS AT JUNCTIONS OF A SPOKE MOUNTING WALL WITH TIRE RETAINING WALLS OF A RIM BODY

(75) Inventor: Chao-Ying Chen, Tainan Hsien (TW)

(73) Assignee: Alex Global Technology, Inc., Tainan Hsien (TW)

( * ) Notice: Subject to any disclaimer, the term of this patent is extended or adjusted under 35 U.S.C. 154(b) by 0 days.

(21) Appl. No.: 10/618,831

(22) Filed: Jul. 14, 2003

(65) Prior Publication Data

US 2004/0075334 A1 Apr. 22, 2004

(30) Foreign Application Priority Data

Oct. 16, 2002 (TW) ........................................ 91216484 U

(51) Int. Cl.⁷ ............................................. B60B 21/00
(52) U.S. Cl. ............................. 301/95.106; 301/95.104; 301/95.107
(58) Field of Search ....................... 301/95.101, 95.102, 301/95.103, 95.104, 95.106, 95.107, 63.101, 63.107

(56) References Cited

U.S. PATENT DOCUMENTS

| | | | | | |
|---|---|---|---|---|---|
| 1,096,842 A | * | 5/1914 | Kelly | ........................... | 152/300 |
| 6,145,936 A | * | 11/2000 | Alberti et al. | ................. | 301/58 |
| 6,145,937 A | * | 11/2000 | Chen | ............................ | 301/58 |
| 6,186,598 B1 | * | 2/2001 | Chen | ............................ | 301/58 |
| 6,367,883 B1 | * | 4/2002 | Chen | ............................ | 301/55 |
| 6,588,474 B2 | * | 7/2003 | Passarotto | .................... | 152/427 |

* cited by examiner

Primary Examiner—Russell D. Stormer
(74) Attorney, Agent, or Firm—Kenneth C Brooks

(57) ABSTRACT

A bicycle wheel rim includes an annular rim body having left and right annular tire retaining walls with inner edges connected to left and right edges of an annular spoke mounting wall. Each of a pair of annular corner reinforcing members is formed integrally with the rim body at a junction of a corresponding one of the left and right edges of the spoke mounting wall with the inner edge of a respective one of the tire retaining walls. Each of the corner reinforcing members extends laterally outward relative to the respective one of the tire retaining walls, and further extends radially inward relative to the spoke mounting wall.

11 Claims, 9 Drawing Sheets

BICYCLE WHEEL RIM HAVING CORNER REINFORCING MEMBERS AT JUNCTIONS OF A SPOKE MOUNTING WALL WITH TIRE RETAINING WALLS OF A RIM BODY

CROSS-REFERENCE TO RELATED APPLICATION

This application claims priority of Taiwanese application no. 091216484, filed on Oct. 16,2002.

BACKGROUND OF THE INVENTION

1. Field of the Invention

The invention relates to a bicycle wheel rim, more particularly to a bicycle wheel rim having annular corner reinforcing members at junctions of an annular spoke mounting wall with left and right annular tire retaining walls of an annular rim body.

2. Description of the Related Art

FIG. 1 illustrates a conventional bicycle wheel rim 1 for use with a tire unit that includes an inner tire 11 and an outer tire 12. The bicycle wheel rim 1 includes left and right annular tire retaining walls 13 and an annular spoke mounting wall 14. Each of the tire retaining walls 13 has an inner edge 131 proximate to a central axis (not shown) of the wheel rim 1, and an outer edge 132 distal from the central axis of the wheel rim 1. The spoke mounting wall 14 interconnects the inner edges 131 of the tire retaining walls 13. Spokes 15 (only one is shown) are mounted on the spoke mounting wall 14.

When the bicycle wheel rim 1 is in use, it is normally subjected to forces (F1) parallel to the spoke mounting wall 14, and forces (F2) parallel to the tire retaining walls 13. The forces (F1, F2) that act in different directions can cause the bicycle wheel rim 1 to deform or even break at junctions of the spoke mounting wall 14 with the tire retaining walls 13.

SUMMARY OF THE INVENTION

Therefore, the object of the present invention is to provide a bicycle wheel rim having annular corner reinforcing members at junctions of an annular spoke mounting wall with left and right annular tire retaining walls of an annular rim body so as to strengthen the overall construction of the bicycle wheel rim.

According to the present invention, a bicycle wheel rim is adapted for mounting a plurality of spokes thereon, and comprises an annular rim body and left and right annular corner reinforcing members formed integrally with the rim body.

The rim body includes left and right annular tire retaining walls adapted for retaining a bicycle tire therebetween, and an annular spoke mounting wall connected to the tire retaining walls and formed with a plurality of spoke fastening holes therethrough for mounting of the spokes thereon. Each of the tire retaining walls has an inner edge proximate to a central axis of the rim body, an outer edge distal from the central axis of the rim body, and an outer lateral surface that extends between the inner and outer edges, that faces away from the other of the tire retaining walls, and that lies on a first plane. The spoke mounting wall has left and right edges, each of which is connected to the inner edge of a respective one of the tire retaining walls, and a radial inner surface that extends between the left and right edges, that faces toward the central axis of the rim body, and that lies on a second plane.

Each of the corner reinforcing members is formed integrally with the rim body at a junction of a corresponding one of the left and right edges of the spoke mounting wall with the inner edge of the respective one of the tire retaining walls. Each of the corner reinforcing members extends laterally outward relative to the first plane of the outer lateral surface of the respective one of the tire retaining walls, and further extends radially inward relative to the second plane of the radial inner surface of the spoke mounting wall.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
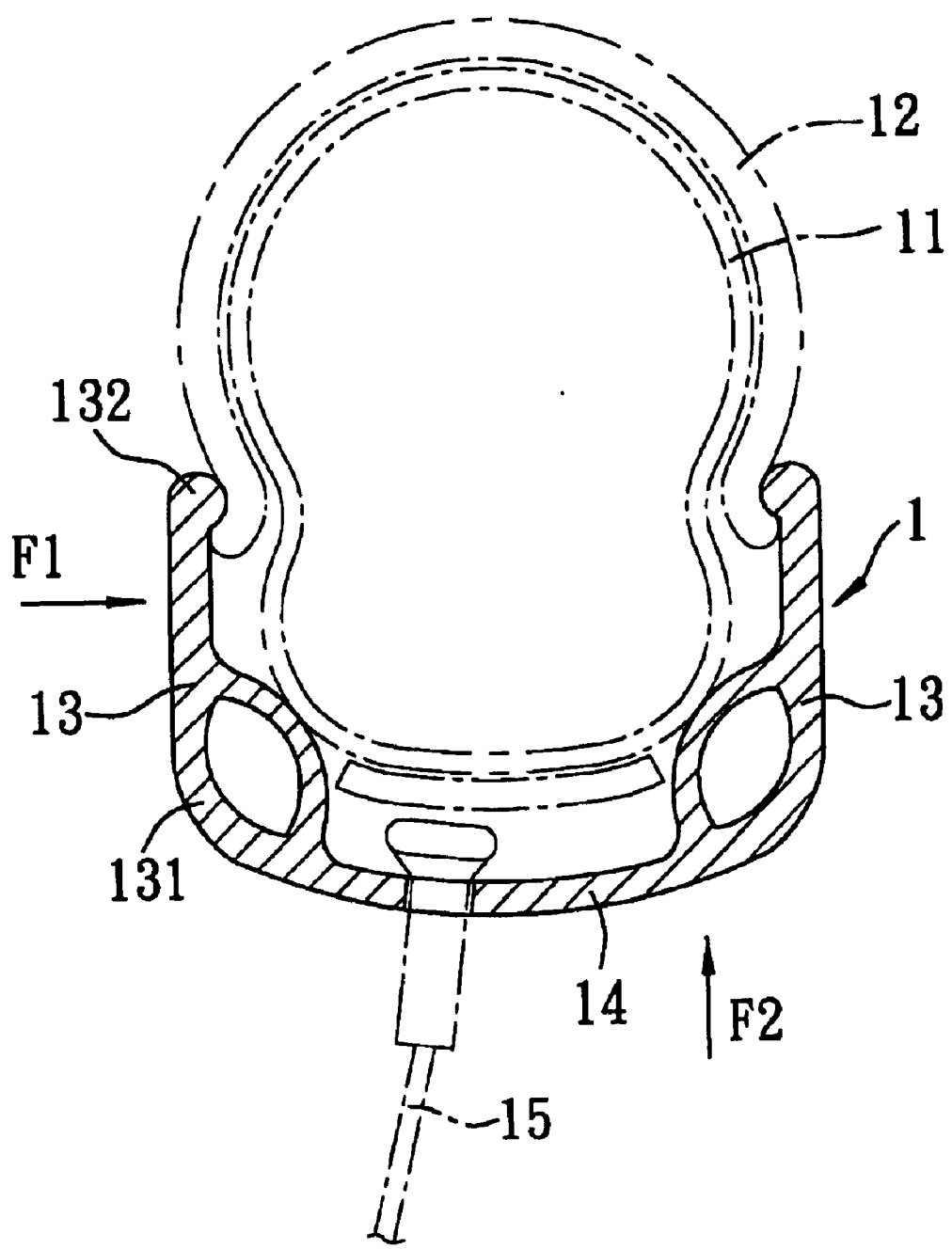
FIG. 1 is an enlarged fragmentary sectional view illustrating a conventional bicycle wheel rim.

Before the present invention is described in greater detail, it should be noted that like elements are denoted by the same reference numerals throughout the disclosure.

Figure 2:
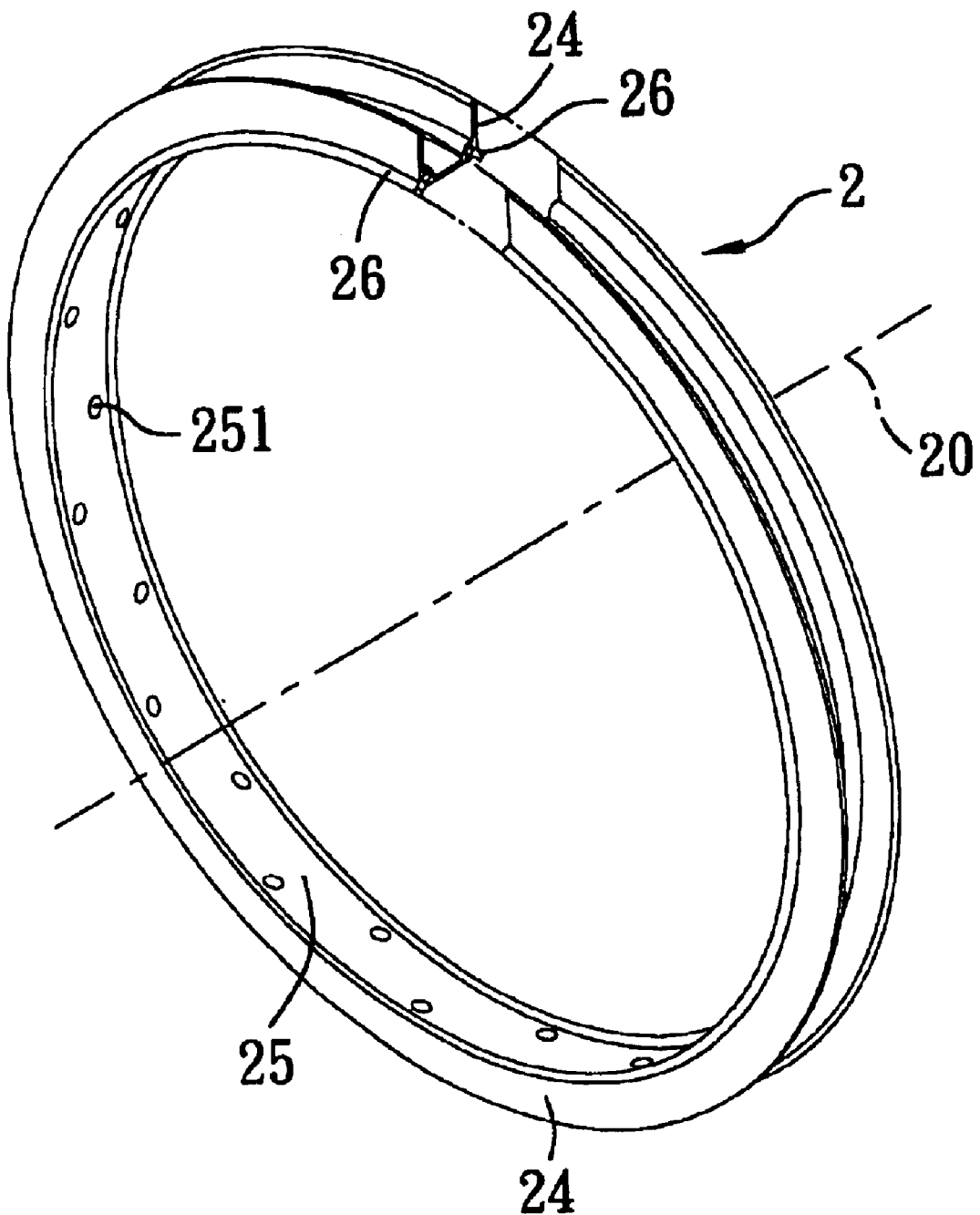
FIG. 2 is a perspective view of the first preferred embodiment of a bicycle wheel rim according to the present invention.
Figure 3:
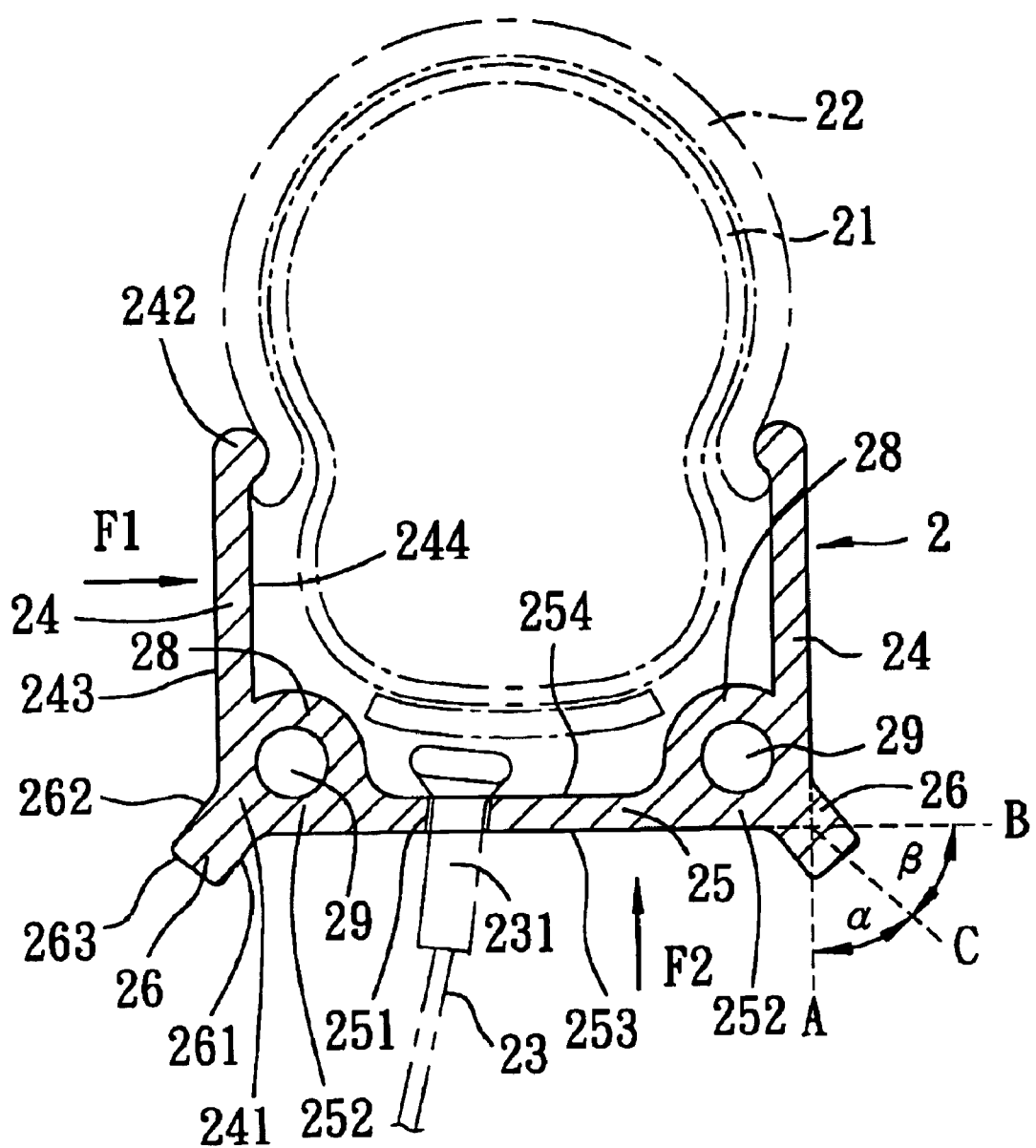
FIG. 3 is an enlarged fragmentary sectional view of the first preferred embodiment.

Referring to FIGS. 2 and 3, the first preferred embodiment of a bicycle wheel rim 2 according to the present invention is shown to be formed from an elongated metal strip, such as an aluminum alloy strip, by bending the strip into an annular shape and subsequently connecting two opposite ends of the strip. The bicycle wheel rim 2 of this embodiment is suitable for use with a bicycle tire unit that includes an inner tire 21 and an outer tire 22, and is adapted for mounting a plurality of spokes 23 (only one is shown in FIG. 3) thereon. Each spoke 23 has a fastener 231 at one end thereof. The bicycle wheel rim 2 includes an annular rim body, and left and right annular corner reinforcing members 26 formed integrally with the rim body.

The annular rim body includes left and right annular tire retaining walls 24 adapted for retaining the bicycle tire unit therebetween, and an annular spoke mounting wall 25 connected to the tire retaining walls 24 and formed with a plurality of spoke fastening holes 251 (only one is shown in FIG. 3) therethrough for mounting of the fasteners 231 on the spokes 23. Each of the tire retaining walls 24 has an inner edge 241 proximate to a central axis 20 (see FIG. 2) of the rim body, an outer edge 242 distal from the central axis 20 of the rim body, an outer lateral surface 243 that extends between the inner and outer edges 241,242, that faces away from the other of the tire retaining walls 24, and that lies on a respective first plane (A) (see FIG. 3), and an inner lateral surface 244 that extends between the inner and outer edges 241,242 and that faces toward the other of the tire retaining walls 24. In this embodiment, the spoke mounting wall 25 has left and right edges 252, each of which is connected integrally and directly to the inner edge 241 of a respective one of the tire retaining walls 24, a radial inner surface 253 that extends between the left and right edges 252, that faces toward the central axis 20 (see FIG. 2) of the rim body, and that lies on a second plane (B) (see FIG. 3), and a radial outer surface 254 that extends between the left and right edges 252 and that faces away from the central axis 20 of the rim body. In this embodiment, the second plane (B) is transverse to the first planes (A) of the outer lateral surfaces 243 of the tire retaining walls 24. The rim body further includes left and right annular hole-confining walls 28, each of which extends from the inner lateral surface 244 of a respective one of the tire retaining walls 24 to the radial outer surface 254 of the spoke mounting wall 25. Each of the hole-confining walls 28 cooperates with the respective one of the tire retaining walls 24 and the spoke mounting wall 25 to confine a pin-receiving hole 29. Pins (not shown) are extended respectively into the pin-receiving holes 29 and cooperate to retain the annular shape of the rim body.

Each of the corner reinforcing members 26 is formed integrally with the rim body at a junction of a corresponding one of the left and right edges 252 of the spoke mounting wall 25 with the inner edge 241 of the respective one of the tire retaining walls 24. Each of the corner reinforcing members 26 extends laterally outward relative to the first plane (A) of the outer lateral surface 243 of the respective one of the tire retaining walls 24, and further extends radially inward relative to the second plane (B) of the radial inner surface 253 of the spoke mounting wall 25. In this embodiment, each of the corner reinforcing members 26 extends along a respective conical plane (C) (see FIG. 3) that forms a first angle ($\alpha$) with the first plane (A) of the outer lateral surface 243 of the respective one of the tire retaining walls 24, and that further forms a second angle ($\beta$) with the second plane (B) of the radial inner surface 253 of the spoke mounting wall 25. Each of the first and second angles ($\alpha$, $\beta$) ranges from 90 to 180 degrees. In this embodiment, each of the first and second angles ($\alpha$, $\beta$) is about 135 degrees. Moreover, each of the corner reinforcing members 26 in the bicycle wheel rim 2 of this embodiment has a distal end 263 remote from the rim body, a planar first surface 262 that extends from the outer lateral surface 243 of the respective one of the tire retaining walls 24 to the distal end 263, and a planar second surface 261 that extends from the radial inner surface 253 of the spoke mounting wall 25 to the distal end 263.

When the bicycle wheel rim 2 of this invention is subjected to forces (F1) parallel to the spoke mounting wall 25, and forces (F2) parallel to the tire retaining walls 24 during use, the integrally formed and inclinedly extending corner reinforcing members 26 strengthen the junctions of the spoke mounting wall 25 with the tire retaining walls 24 to avoid deformation and breaking of the bicycle wheel rim 2 at the junctions. In other words, the corner reinforcing members 26 enhance the strength of the overall construction of the bicycle wheel rim 2.

Figure 4:
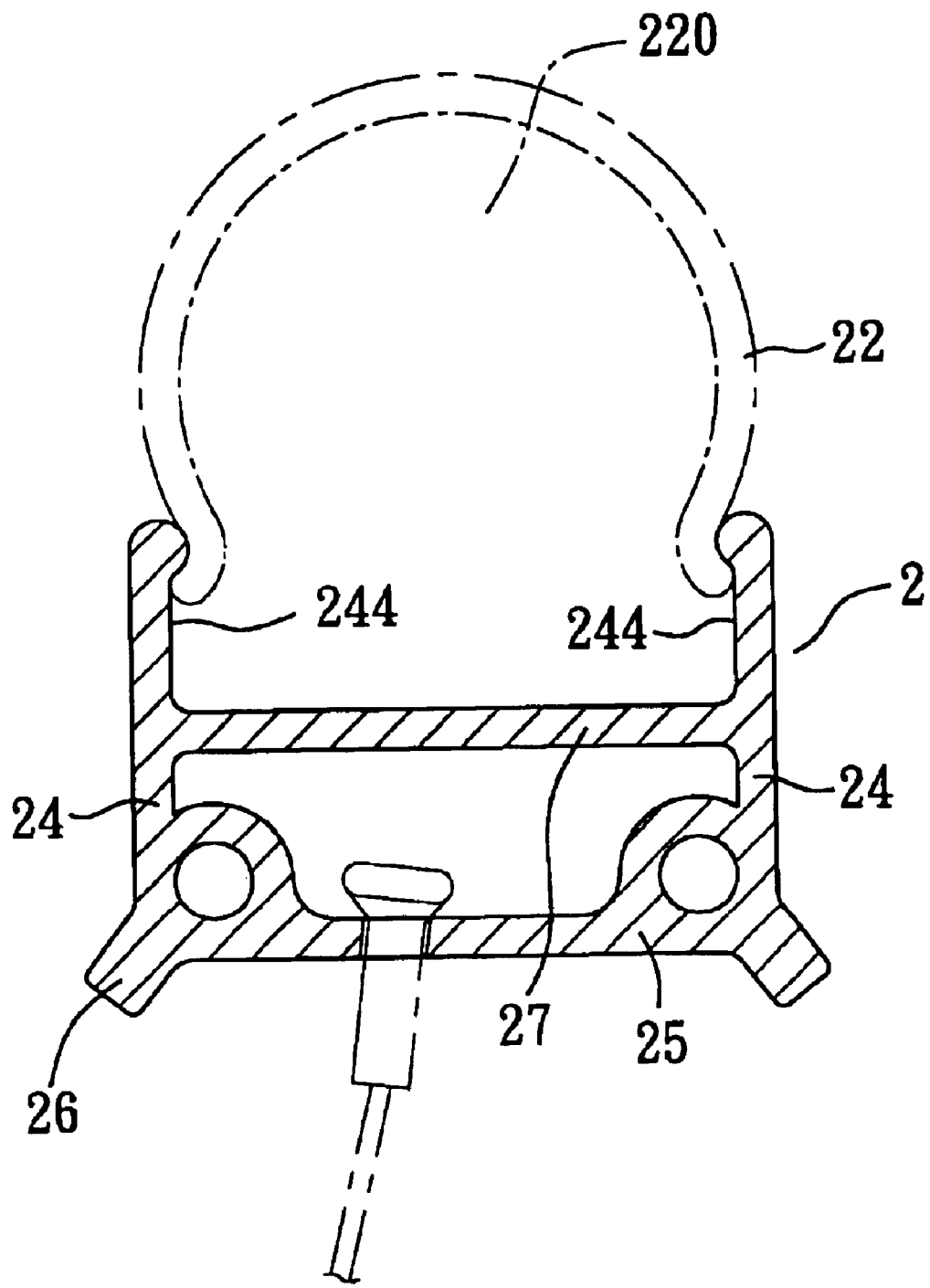
FIG. 4 is an enlarged fragmentary sectional view of the second preferred embodiment of a bicycle wheel rim according to the present invention.

FIG. 4 illustrates the second preferred embodiment of a bicycle wheel rim 2 according to this invention, which is suitable for a bicycle tire unit that only includes an outer tire 22. As compared to the previous embodiment, the rim body further includes an annular bridging wall 27 surrounding the spoke mounting wall 25 and extending between the inner lateral surfaces 244 of the tire retaining walls 24. The bridging wall 27 cooperates with the tire retaining walls 24 and the outer tire 22 to form an air-inflating compartment 220.

Figure 5:
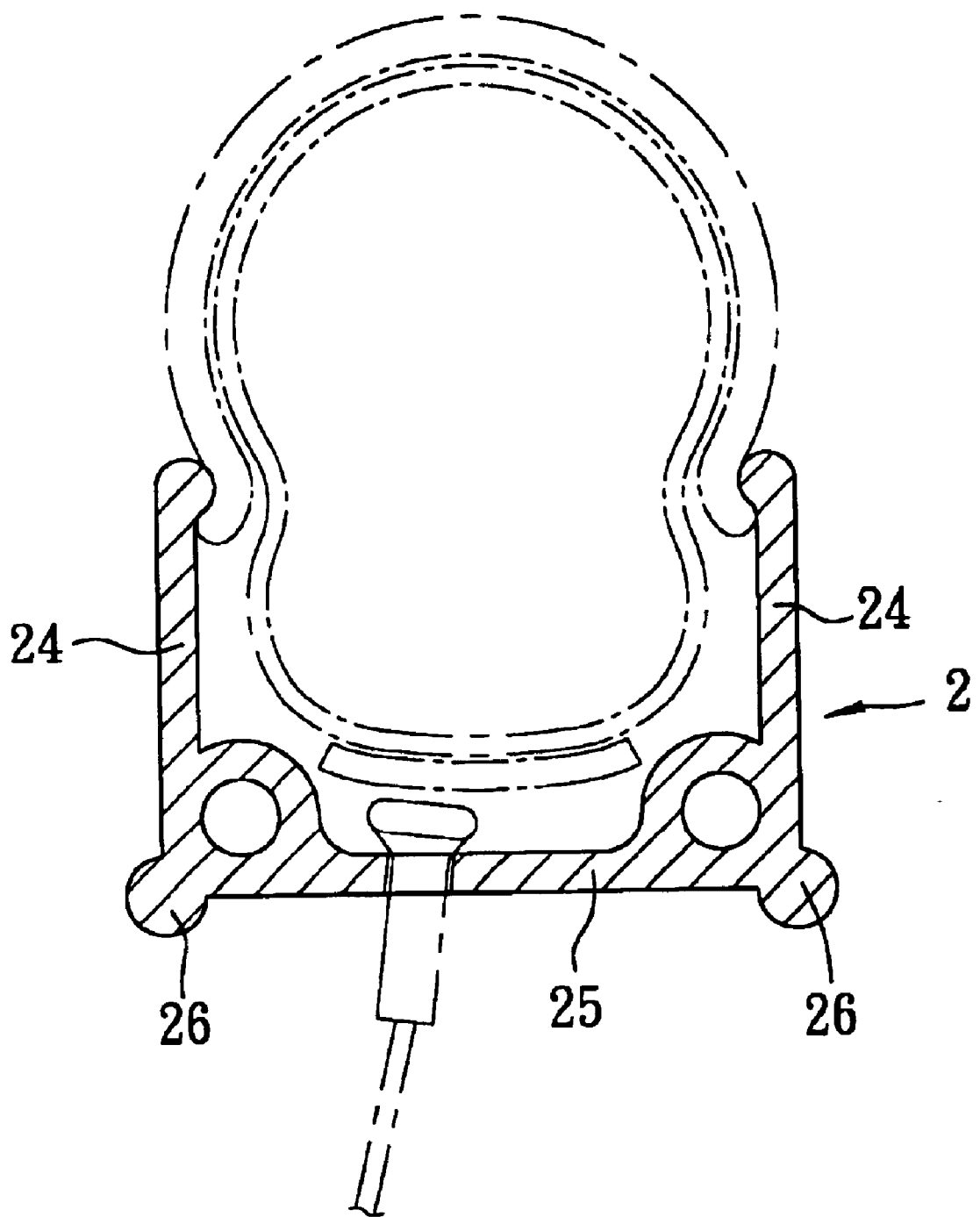
FIG. 5 is an enlarged fragmentary sectional view of the third preferred embodiment of a bicycle wheel rim according to the present invention.

FIG. 5 illustrates the third preferred embodiment of a bicycle wheel rim 2 according to this invention, which is a modification of the first preferred embodiment. The present embodiment differs from the first preferred embodiment primarily in the shape of the corner reinforcing members 26. Particularly, in this embodiment, each of the corner reinforcing members 26 has a rounded cross-section.

Figure 6:
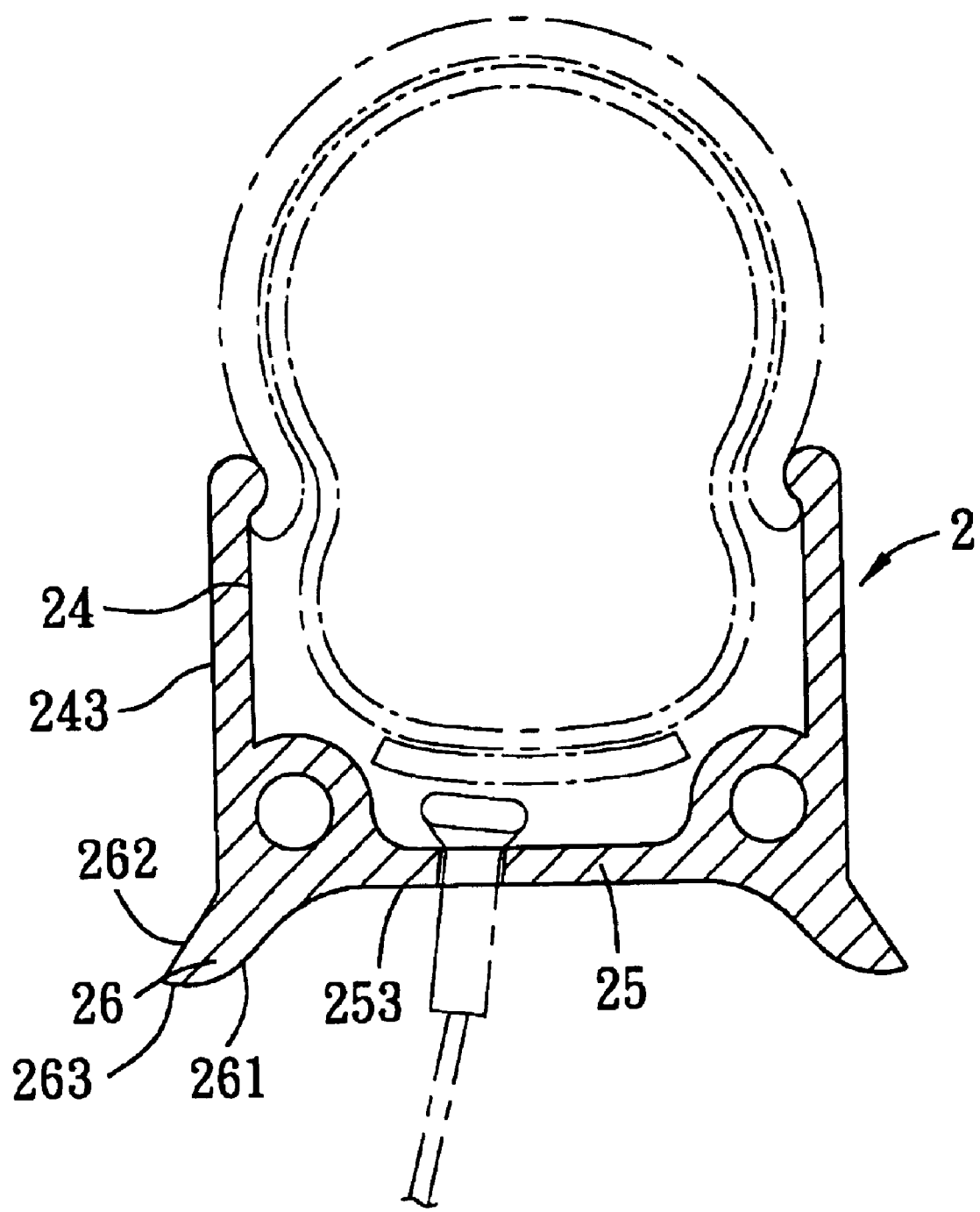
FIG. 6 is an enlarged fragmentary sectional view of the fourth preferred embodiment of a bicycle wheel rim according to the present invention.

FIG. 6 illustrates the fourth preferred embodiment of a bicycle wheel rim 2 according to this invention, which is a modification of the first preferred embodiment. The present embodiment also differs from the first preferred embodiment primarily in the shape of the corner reinforcing members 26. In this embodiment, each of the corner reinforcing members 26 has a tapering cross-section with a distal end 263 remote from the rim body, a planar first surface 262 that extends from the outer lateral surface 243 of the respective one of the tire retaining walls 24 to the distal end 263, and a curved second surface 261 that extends from the radial inner surface 253 of the spoke mounting wall 25 to the distal end 263.

Figure 7:
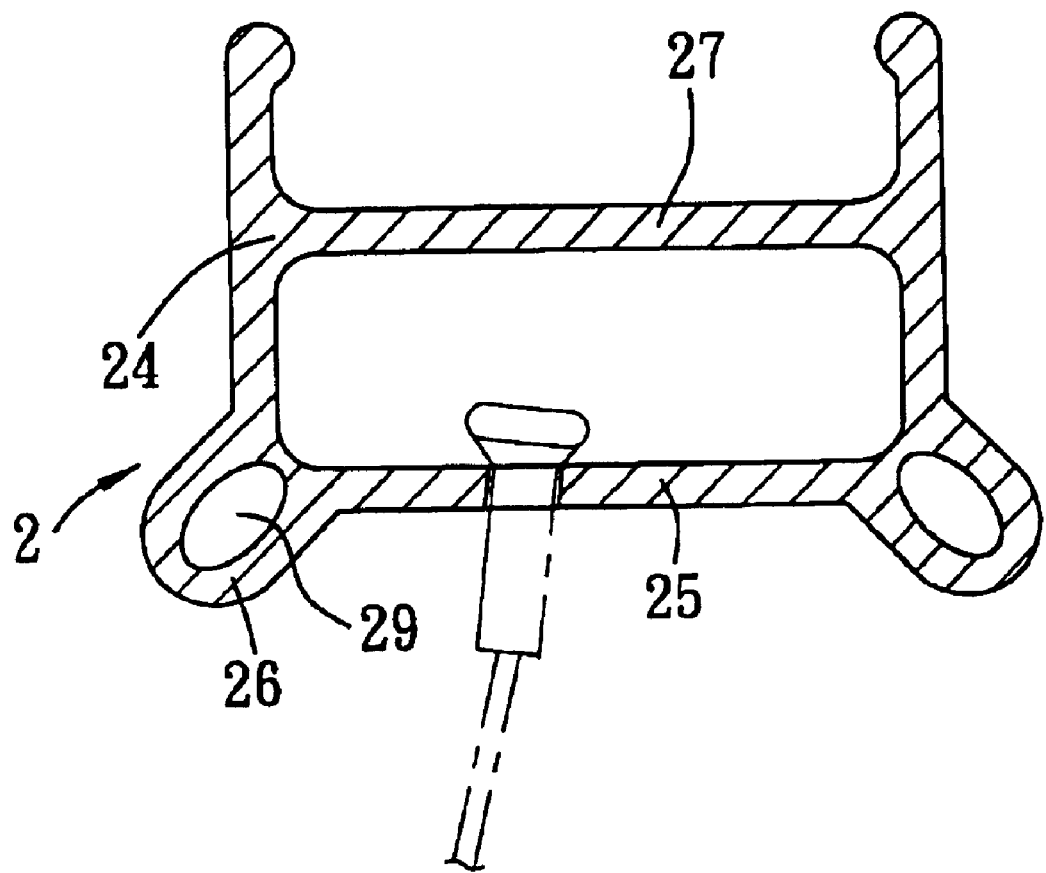
FIG. 7 is an enlarged fragmentary sectional view of the fifth preferred embodiment of a bicycle wheel rim according to the present invention.

FIG. 7 illustrates the fifth preferred embodiment of a bicycle wheel rim 2 according to this invention, which is a modification of the embodiment shown in FIG. 4. In this embodiment, each of the corner reinforcing members 26 is formed with a corresponding pin-receiving hole 29 therealong. Each corner reinforcing member 26 in the bicycle wheel rim 2 of the fifth preferred embodiment has an oval cross-section, and each pin-receiving hole 29 is oval-shaped.

Figure 8:
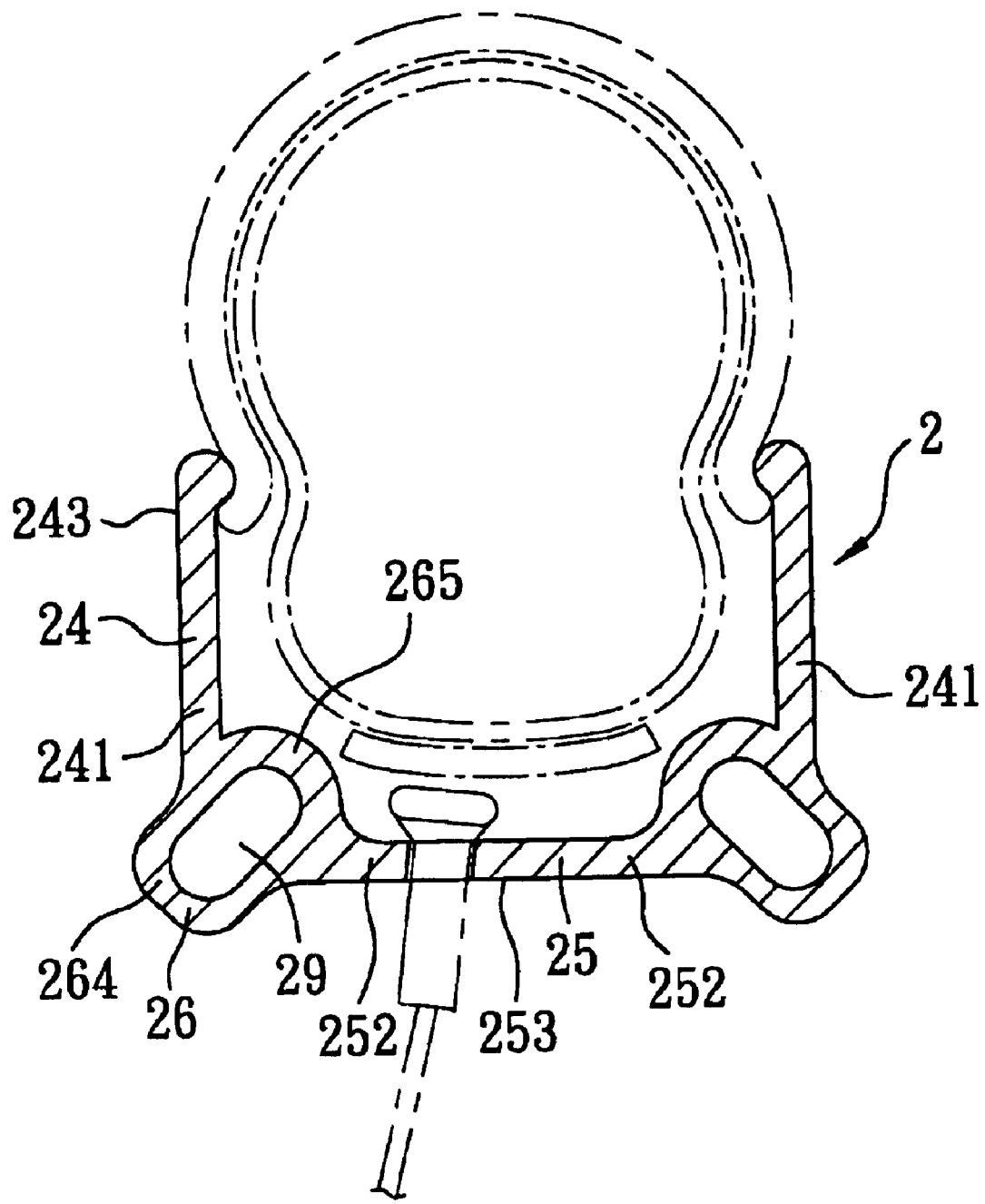
FIG. 8 is an enlarged fragmentary sectional view of the sixth preferred embodiment of a bicycle wheel rim according to the present invention.

FIG. 8 illustrates the sixth preferred embodiment of a bicycle wheel rim 2 according to this invention, which is a modification of the first preferred embodiment. In this embodiment, each of the corner reinforcing members 26 includes curved internal and external wall portions 265, 264 that cooperate to confine a pin-receiving hole 29 therealong and that connect the corresponding one of the left and right edges 252 of the spoke mounting wall 25 to the inner edge 241 of the respective one of the tire retaining walls 24. The internal wall portion 265 extends laterally inward relative to the outer lateral surface 243 of the respective one of the tire retaining walls 24, and is disposed radially outward relative to the radial inner surface 253 of the spoke mounting wall 25. The external wall portion 264 extends laterally outward relative to the outer lateral surface 243 of the respective one of the tire retaining walls 24, and is disposed radially inward relative to the radial inner surface 253 of the spoke mounting wall 25.

Figure 9:
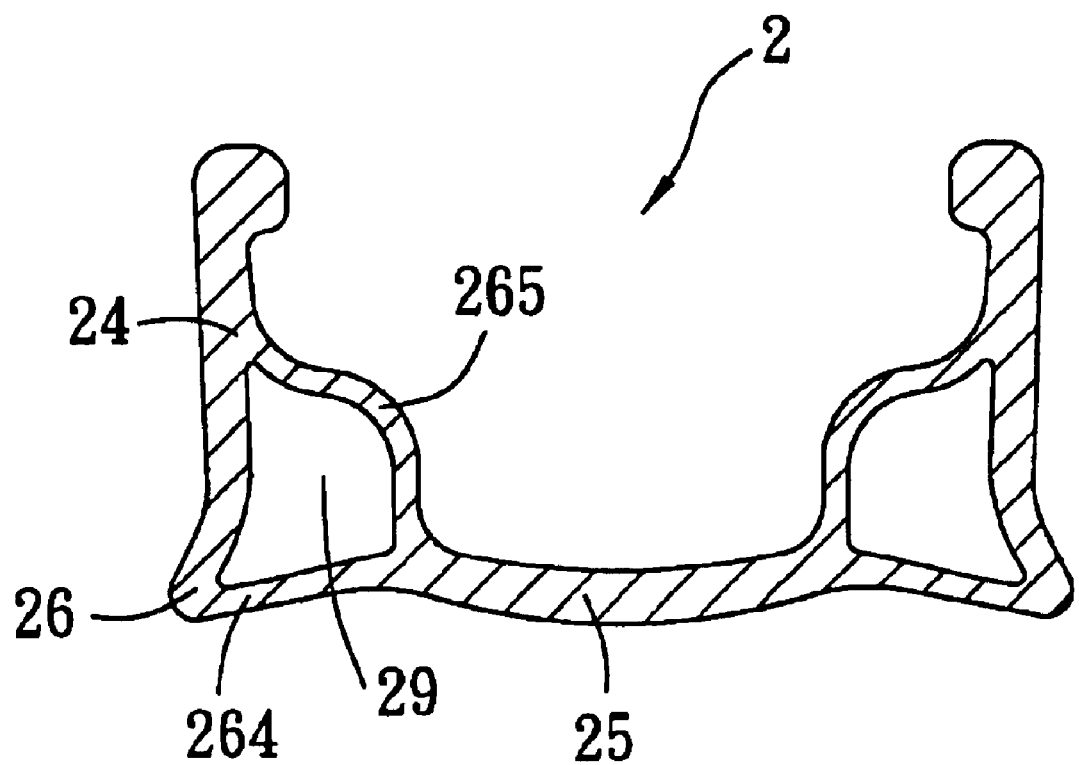
FIG. 9 is an enlarged fragmentary sectional view of the seventh preferred embodiment of a bicycle wheel rim according to the present invention.

FIG. 9 illustrates the seventh preferred embodiment of a bicycle wheel rim 2 according to the present invention, which is a modification of the embodiment shown in FIG. 8. Unlike the embodiment of FIG. 8, the internal wall portion 265 of each corner reinforcing member 26 has a curved cross-section, whereas the external wall portion 264 of each corner reinforcing member 26 has a generally V-shaped cross-section.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A bicycle wheel rim for mounting a plurality of spokes thereon, comprising:

an annular rim body including left and right annular tire retaining walls adapted for retaining a bicycle tire therebetween, and an annular spoke mounting wall connected to said tire retaining walls and formed with a plurality of spoke fastening holes therethrough for mounting of the spokes thereon, each of said tire retaining walls having an inner edge proximate to a central axis of said rim body, an outer edge distal from said central axis of said rim body, and an outer lateral surface that extends between said inner and outer edges, that faces away from the other of said tire retaining walls, and that lies on a first plane, said spoke mounting wall having left and right edges, each of which is connected to said inner edge of a respective one of said tire retaining walls, and a radial inner surface that extends between said left and right edges, that faces toward said central axis of said rim body, and that lies on a second plane; and left and right annular corner reinforcing members, each of which is formed integrally with said rim body at a junction of a corresponding one of said left and right edges of said spoke mounting wall with said inner edge of the respective one of said tire retaining walls, each of said corner reinforcing members extending laterally outward relative to the first plane of said outer lateral surface of the respective one of said tire retaining walls, and further extending radially inward relative to the second plane of said radial inner surface of said spoke mounting wall.

2. The bicycle wheel rim as claimed in claim 1, wherein each of said corner reinforcing members extends along a respective conical plane that forms a first angle with the first plane of said outer lateral surface of the respective one of said tire retaining walls, and that further forms a second angle with the second plane of said radial inner surface of said spoke mounting wall, each of said first and second angles ranging from 90 to 180 degrees.

3. The bicycle wheel rim as claimed in claim 1, wherein:

each of said tire retaining walls further has an inner lateral surface that extends between said inner and outer edges and that faces toward the other of said tire retaining walls;

said spoke mounting wall further having a radial outer surface that extends between said left and right edges and that faces away from said central axis of said rim body;

said rim body further including left and right annular hole-confining walls, each of which extends from said inner lateral surface of a respective one of said tire retaining walls to said radial outer surface of said spoke mounting wall, each of said hole-confining walls cooperating with the respective one of said tire retaining walls and said spoke mounting wall to confine a pin-receiving hole.

4. The bicycle wheel rim as claimed in claim 1, wherein:

each of said tire retaining walls further has an inner lateral surface that extends between said inner and outer edges and that faces toward the other of said tire retaining walls;

said rim body further including an annular bridging wall surrounding said spoke mounting wall and extending between said inner lateral surfaces of said tire retaining walls.

5. The bicycle wheel rim as claimed in claim 1, wherein each of said corner reinforcing members has a rounded cross-section.

6. The bicycle wheel rim as claimed in claim 1, wherein each of said corner reinforcing members has a distal end remote from said rim body, a planar first surface that extends from said outer lateral surface of the respective one of said tire retaining walls to said distal end, and a curved second surface that extends from said radial inner surface of said spoke mounting wall to said distal end.

7. The bicycle wheel rim as claimed in claim 1, wherein each of said corner reinforcing members is formed with a pin-receiving hole therealong.

8. The bicycle wheel rim as claimed in claim 7, wherein each of said corner reinforcing members has an oval cross-section.

9. The bicycle wheel rim as claimed in claim 8, wherein said pin-receiving hole is oval-shaped.

10. The bicycle wheel rim as claimed in claim 7, wherein each of said corner reinforcing members includes internal and external wall portions that cooperate to confine said pin-receiving hole, each of said internal and external wall portions connecting the corresponding one of said left and right edges of said spoke mounting wall to said inner edge of the respective one of said tire retaining walls, said internal wall portion extending laterally inward relative to said outer lateral surface of the respective one of said tire retaining walls and being disposed radially outward relative to said radial inner surface of said spoke mounting wall, said external wall portion extending laterally outward relative to said outer lateral surface of the respective one of said tire retaining walls and being disposed radially inward relative to said radial inner surface of said spoke mounting wall.

11. The bicycle wheel rim as claimed in claim 10, wherein said internal wall portion has a curved cross-section and said external wall portion has a generally V-shaped cross-section.

* * * * *